(12) United States Patent
Smith

(10) Patent No.: US 10,869,579 B2
(45) Date of Patent: Dec. 22, 2020

(54) SHOWER BELT DROWNING PREVENTION DEVICE

(71) Applicant: Richard John Smith, Orangeville (CA)

(72) Inventor: Richard John Smith, Orangeville (CA)

( * ) Notice: Subject to any disclaimer, the term of this patent is extended or adjusted under 35 U.S.C. 154(b) by 0 days.

(21) Appl. No.: 15/932,515

(22) Filed: Mar. 12, 2018

(65) Prior Publication Data

US 2019/0277425 A1    Sep. 12, 2019

(51) Int. Cl.
*F16K 31/46*   (2006.01)
*A62B 35/00*   (2006.01)
*A47K 3/28*    (2006.01)
*A47K 3/00*    (2006.01)

(52) U.S. Cl.
CPC .............. *A47K 3/001* (2013.01); *A47K 3/281* (2013.01); *A62B 35/00* (2013.01); *A62B 35/0043* (2013.01); *F16K 31/465* (2013.01)

(58) Field of Classification Search
CPC ... F16K 31/465; A62B 35/0043; A62B 35/00; A47K 3/001; A47K 3/125; A47K 3/286; A47K 3/281; A47K 17/02; A47K 4/00; A61G 7/1003
USPC ........................................... 4/661; 482/55–56
See application file for complete search history.

(56) References Cited

U.S. PATENT DOCUMENTS

| | | | | |
|---|---|---|---|---|
| 2,056,849 A * | 10/1936 | Gillett | ..................... | A47K 3/001 4/576.1 |
| 2,572,615 A * | 10/1951 | Hansen | ................... | A47K 3/001 248/316.3 |
| 2,965,313 A * | 12/1960 | Jay | ............................. | E03C 1/08 138/45 |
| 3,713,179 A * | 1/1973 | Dubiel | ................... | A47K 3/001 4/577.1 |
| 4,100,996 A * | 7/1978 | Sharp | ..................... | A62B 35/04 182/3 |
| 4,109,905 A * | 8/1978 | Meier | ..................... | A63B 69/12 24/115 H |
| 4,685,671 A * | 8/1987 | Hagerman | ............. | A63B 21/04 482/124 |
| 5,220,697 A * | 6/1993 | Birchfield | .............. | A47K 3/281 4/559 |
| 6,474,621 B1 * | 11/2002 | Vogel | ...................... | E03C 1/041 137/382 |
| 6,922,857 B2 * | 8/2005 | Palma | ...................... | A47K 3/12 4/573.1 |
| 7,694,359 B1 * | 4/2010 | Hall | ...................... | E03C 1/0408 239/581.1 |
| 10,111,795 B2 * | 10/2018 | King | ....................... | A47K 1/14 |
| 2005/0272565 A1 * | 12/2005 | Hao | ................... | A63B 22/0235 482/54 |

(Continued)

FOREIGN PATENT DOCUMENTS

| | | | | | |
|---|---|---|---|---|---|
| GB | 1354019 A | * | 6/1974 | ........... | A61G 7/1003 |
| GB | 2310586 A | * | 9/1997 | ............. | A62B 35/04 |

*Primary Examiner* — Erin Deery

(57) ABSTRACT

The present invention relates to a drowning prevention device for use in the shower employing an autonomous, gravity-based mechanism. In one example, the drowning prevention device comprises a harness comprising a belt and a lanyard. In a fall situation, the body weight of a user wearing the belt of the drowning prevention device directs the force to the lanyard which pulls an attached cable connected to the shower's valve arm, closing the valve arm and stopping water flow.

4 Claims, 8 Drawing Sheets

(56) References Cited

U.S. PATENT DOCUMENTS

2014/0251723 A1\* 9/2014 Moriah ................. A47K 3/281
182/3

\* cited by examiner

SHOWER BELT DROWNING PREVENTION DEVICE

CROSS-REFERENCE TO RELATED APPLICATIONS

This application claims the benefit of U.S. Provisional Application No. 62/601,320 filed Mar. 20, 2017, entitled "Pssov."

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The present invention relates to a drowning prevention device for use in the shower, designed primarily for people suffering from cognitive disruptions, including epilepsy, for example, or balance issues. People suffering from epilepsy, and certain other conditions, are at risk of losing consciousness in the shower, which can lead to serious injury and possibly death due to drowning.

An example of similar art is a pull string alarm seen in some hotel bathrooms. The string, when pulled, signals the front desk. Once signaled, a hotel worker first calls the room. If there is no answer, the hotel worker takes a key and lets themselves in. This type of alarm requires the user to be conscious to operate, does not stop water flow, and depends on the availability of the front desk staff.

The device of the invention is new, novel and needed. People afflicted with cognitive or muscular afflictions are at a rate 10 times higher than un-afflicted people for accidents in the bathroom.

It is reported that epilepsy claims 88 people every day due to drowning in and around the bathroom.

Those suffering from Parkinson's disease and multiple sclerosis are also at risk.

It is reported that the elderly have ⅔rds of their serious injuries in and around the bathtub or the shower.

In addition to grief, the loss of a family member can lead to significant cost to the family and the government. This can include loss of income for the family and the expenditure of a drowning investigation, for example.

In addition, having to monitor someone at risk, or being monitored, is a duty and a stress every day. This can cause the at-risk person to become depressed because they are so dependent on others and a focal point of worry.

It is a goal of the invention to allow an afflicted person the independence to attach the device to themselves and be kept safe, showering whenever they wish.

The present invention relates to a drowning prevention device for use while showering. Other prevention products are already known and available which help reduce the number of dangerous occurrences. However, these products require the cognitive coordination from the user.

Products ranging from grab bars and medical alert push button communicators work well but the user has to be able to support their own safety. The present invention has been specifically designed to reduce secondary injury due to water exposure resulting from slip and fall situations by employing an autonomous mechanism.

Thus, the object of this invention is to offer safety advantages to the user while showering. Slip and fall accidents in the bathroom represent the majority of all ambulance rides to the hospital. These accidents will always happen, which may lead to serious injuries ranging from broken hips to head injuries. This device stops the flow of water, thus negating secondary injury due to uncontrolled water exposure, including drowning, scalding, and vegetative state due to cerebral hypoxia. Some of these injuries require 24 hour personal care for the remainder of the injured person's life. It quickly becomes apparent that the need to control water exposure is very serious. There are very few devices available that address this problem and fatalities as the population grows sadly become more common.

BRIEF SUMMARY OF THE INVENTION

According to a first broad aspect of the invention, there is provided a safety device for prevention of drowning, comprising: a harness, the harness comprising a belt configured to be worn by a user and a lanyard having first and second ends, a hoop at the first end connecting the lanyard to the belt, and a nipple at the second end, the lanyard further comprising a quick release clasp; a tube containing a rod, the rod freely slidable within the tube; a cable having first and second ends, the cable contained and freely movable within a cable housing; a guide configured to attach to a surface adjacent a shower, the guide receiving the cable housing therein; a water valve having a valve arm and a perch attached to the water valve; wherein the tube has a first open end and a second end attached to the cable housing; wherein the nipple is attached to the rod; wherein the cable is attached on the first end to the valve arm and on the second end to the rod; wherein, in response to a pulling force on the lanyard, the rod slides in the tube thereby pulling the cable and closing the water valve, the lanyard releasing from the rod when the rod slides out of the first open end of the tube.

According to another aspect of the invention, there is provided the safety device of the preceding paragraph, wherein the nipple is received in a seat of the rod.

According to another aspect of the invention, there is provided the safety device of one or more of the preceding paragraphs, wherein the perch guides the cable to the valve arm.

BRIEF DESCRIPTION OF THE SEVERAL VIEWS OF THE DRAWING(S)

The foregoing and other features of the present invention will become apparent to one skilled in the art to which the present invention relates upon consideration of the following description of the invention with reference to the accompanying drawings, wherein.

DETAILED DESCRIPTION OF THE INVENTION

Figure 1:
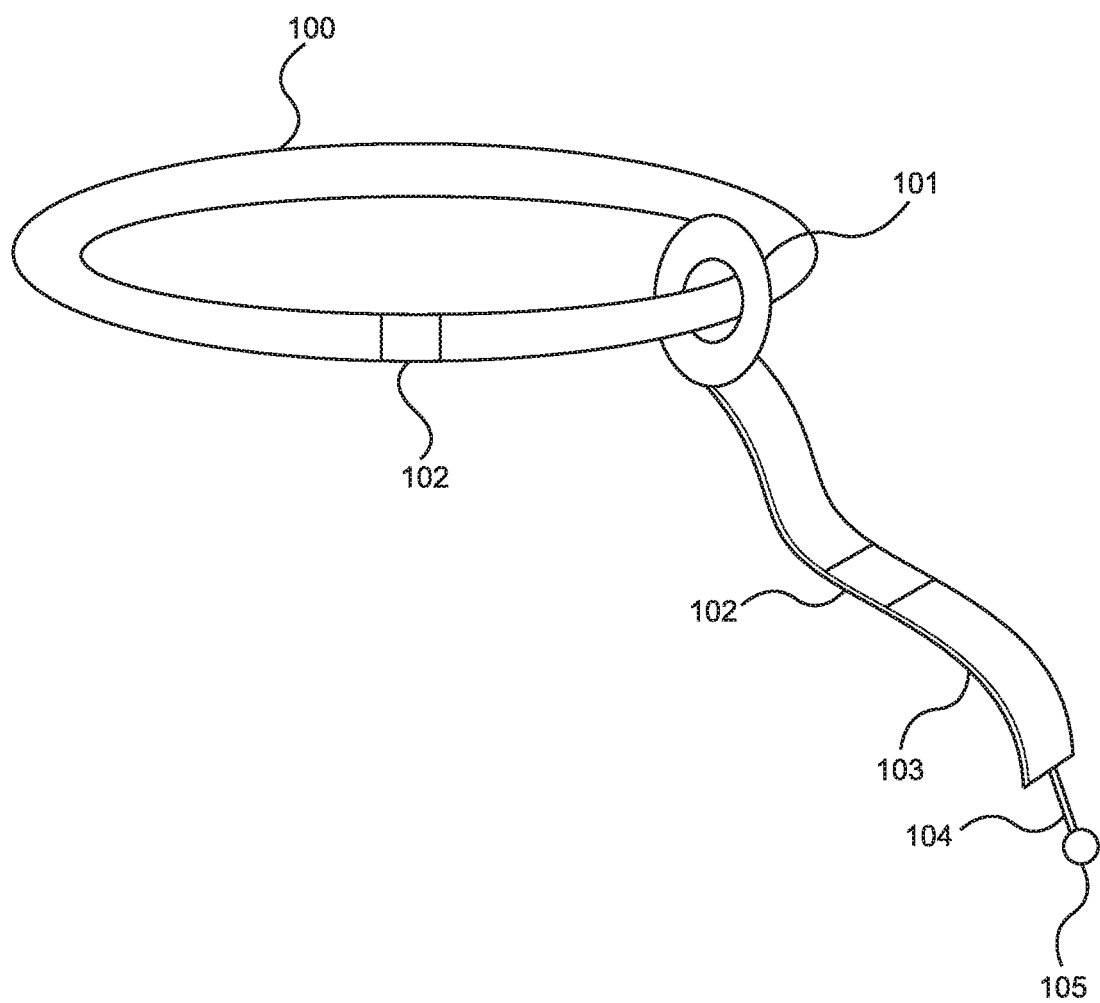
FIG. 1 is a front perspective view of the belt and lanyard of the invention.

FIG. 1 shows an embodiment of the belt and lanyard element of the present invention. Shown in FIG. 1 is a belt (100) to be worn by the user. Belt (100) is designed to fit around the user. Belt (100) is connected to a lanyard (103) with a hoop (101) attached to a first end of the lanyard (103) by passing the belt through hoop (101) as shown in FIG. 1. The belt may be made of any material(s) recognizable by those skilled in the art as being of suitable strength and water durability for the intended use and environment, such as nylon, polypropylene, and the like.

At the second end of lanyard (103), which second end is away from belt (100) and hoop (101), is attached a lanyard connection cable (104) with two ends. The first end of the lanyard connection cable (104) is attached to the second end of lanyard (103) and the second end of the lanyard connection cable (104) is connected to a nipple (105). The lanyard (103) further comprises one or more quick release clasps (102) to make connecting and disconnecting from the device easy for the user.

The nipple (105) at the second end of the lanyard connection cable (104) connects the lanyard connection cable, lanyard, belt and, ultimately, the user, to a slide release rod (106) and slide release tube (110), as described in further detail below.

Figure 2A:
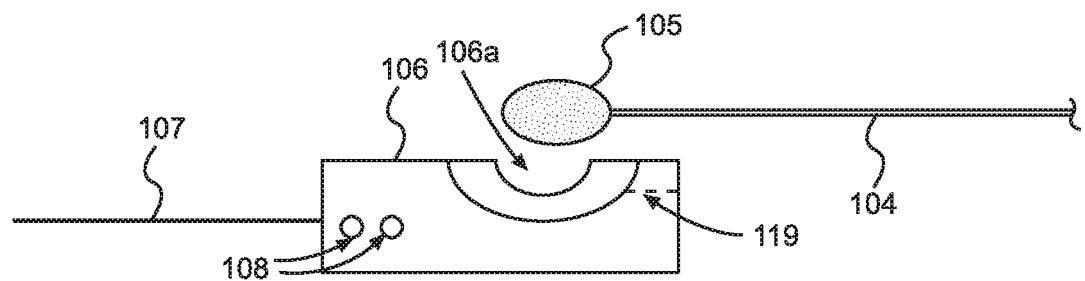
FIG. 2A is a side view of the slide release rod and nipple before seating the nipple within the seat.
Figure 2B:
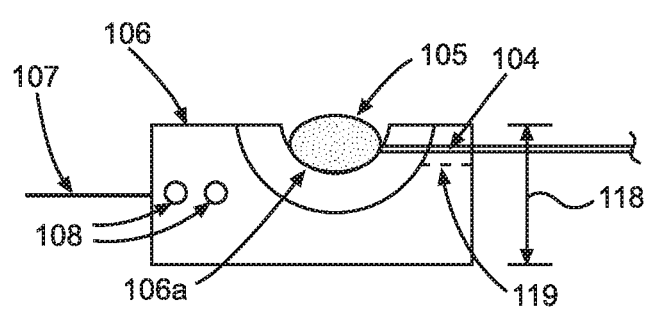
FIG. 2B is a side view of the slide release rod and nipple with the nipple seated within the seat on the slide release rod.

Slide release tube (110) has two ends. It is open at the first end. The slide release tube (110) contains a slide release rod (106) which moves freely slidable within slide release tube (110) through the first end of the slide release tube. As shown in FIGS. 2D and 2E, the diameter of the slide release rod (106) is very close to the inside diameter of the slide release tube (110), such that the slide release rod (106) is freely slidable within the slide release tube (110), but the nipple (105) is held in place in the seat (106a) while the seat (106a) is within the slide release tube (110) due to the position of the inside wall of the slide release tube (110).

The first end of slide release rod (106) has a cut out called a seat (106a), within which nipple (105) sits. As shown in FIG. 2B, the seat (106a) is cut to the same diameter as the nipple (105). The nipple (105) when resting in the seat (106a) is the same diameter (118) as the slide release rod (106).

Figure 2C:
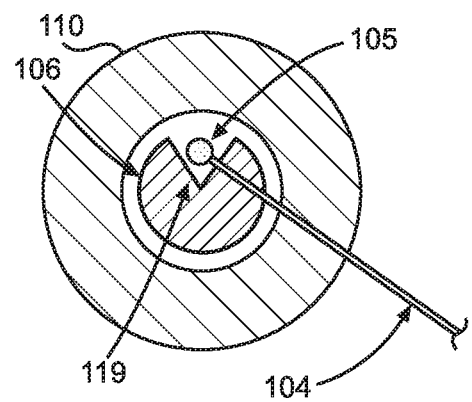
FIG. 2C is an end view of the slide release rod with the lanyard connection cable within the channel on the slide release rod.
Figure 2D:
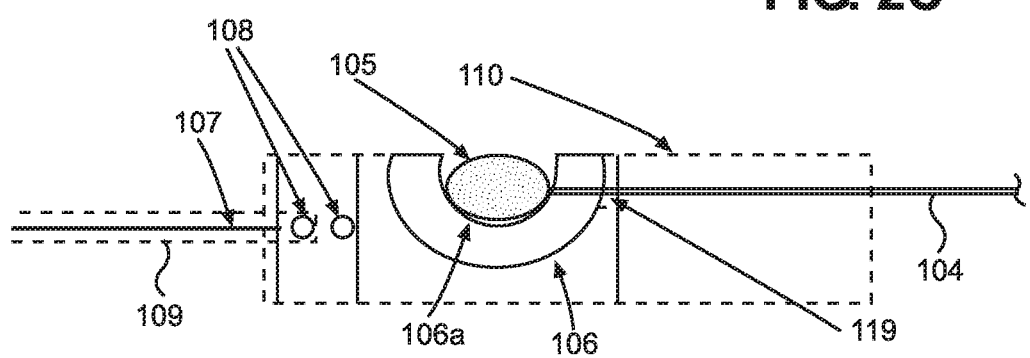
FIG. 2D is a side view showing the slide release rod and nipple within the slide release tube (shown in stippled lines)
Figure 2E:
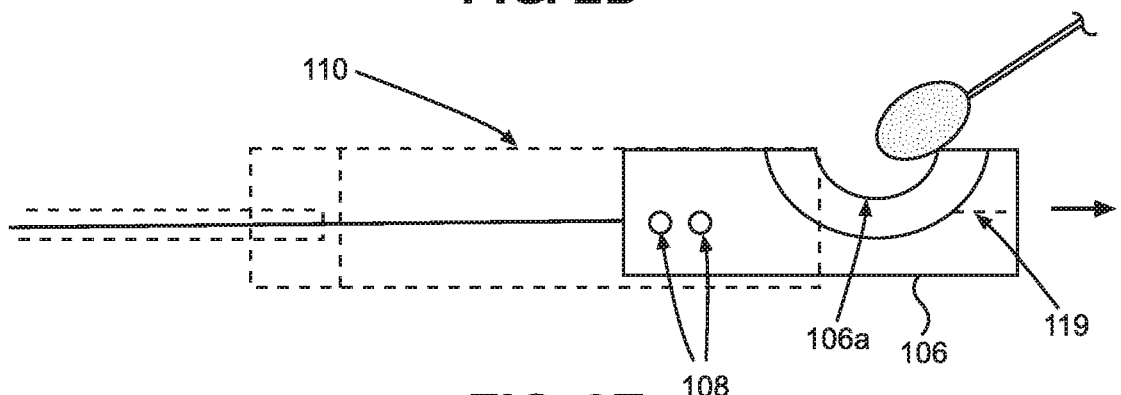
FIG. 2E is a side view showing the slide release rod pulling out of the slide release tube (shown in stippled lines), the nipple coming out of the seat.
Figure 3A:
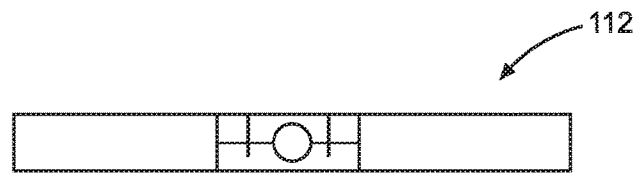
FIG. 3A is a bottom view of the cable guide of the invention.
Figure 3B:
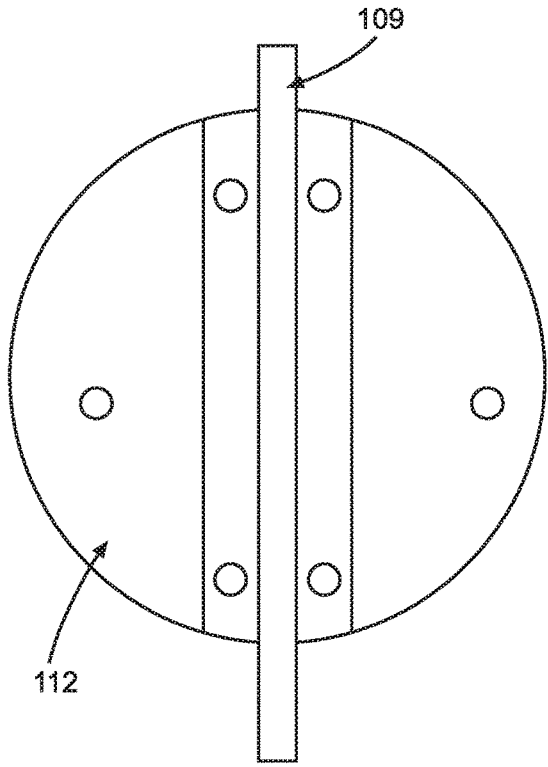
FIG. 3B is a front view of the cable guide of the invention without the plate in place.
Figure 3C:
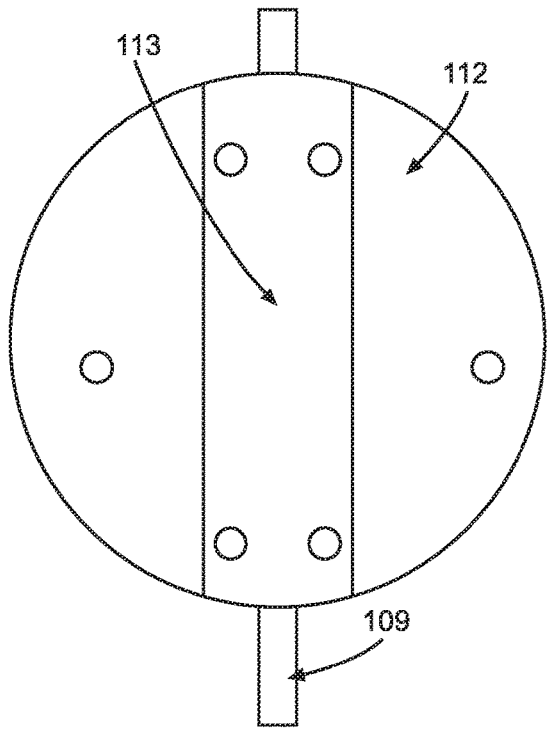
FIG. 3C is a front view of the cable guide of the invention with the plate in place.
Figure 3D:
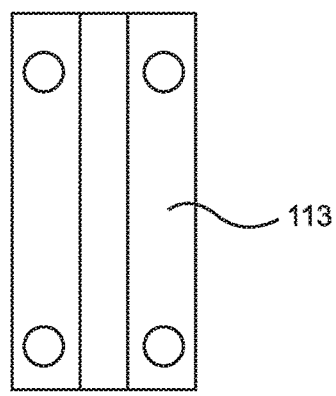
FIG. 3D is a view of the inside face of the plate to be fastened to the cable guide.

As shown in FIG. 2C, the slide release rod (106) may have a channel (119) running longitudinally from the seat (106a) to the end of the slide release rod (106) to allow the lanyard connecting cable (104) to sit within this channel and along the slide release rod (106) and not obstruct free movement of the slide release rod (106) within the slide release tube (110). When the slide release rod (106) is within the slide release tube (110), the nipple (105) is held in the seat (106a) of the slide release rod (106) by the inside of the slide release tube (110) as noted above. This design allows the slide release rod (106) to be pulled to the first open end of the slide release tube (110). When the seat (106a) is pulled out of the first end of the slide release tube (110), the nipple (105) is no longer held in the seat (106a) and disconnects from the slide release rod (106), as shown in FIG. 2E.

A first end of an activation cable (107) runs through the cable housing (109) freely and attaches to the second end of the slide release rod (106) held in place by cable set screws (108).

The cable housing (109) and activation cable (107) then pass through the cable guide (112). The cable housing (109) is contained within a channel in a cable guide (112) by a cover plate (113) that is removably attachable to the cable guide (112). This holds the housing firmly while allowing free movement of the activation cable (107) within. It will be appreciated that, in some embodiments, the cable guide (112) may be mounted on the surface closer to the side of the shower which the user enters.

Figure 4:
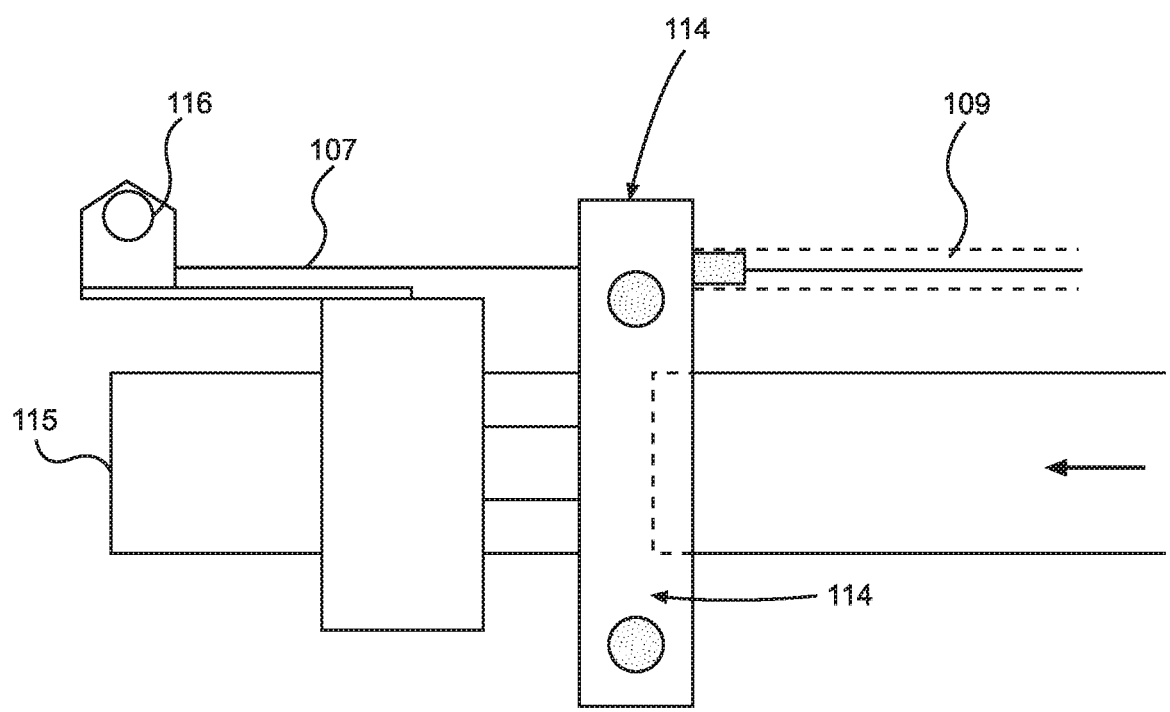
FIG. 4 is a bottom view of the water valve cable perch of the invention, with the direction of water flow indicated by an unnumbered arrow.
Figure 5A:
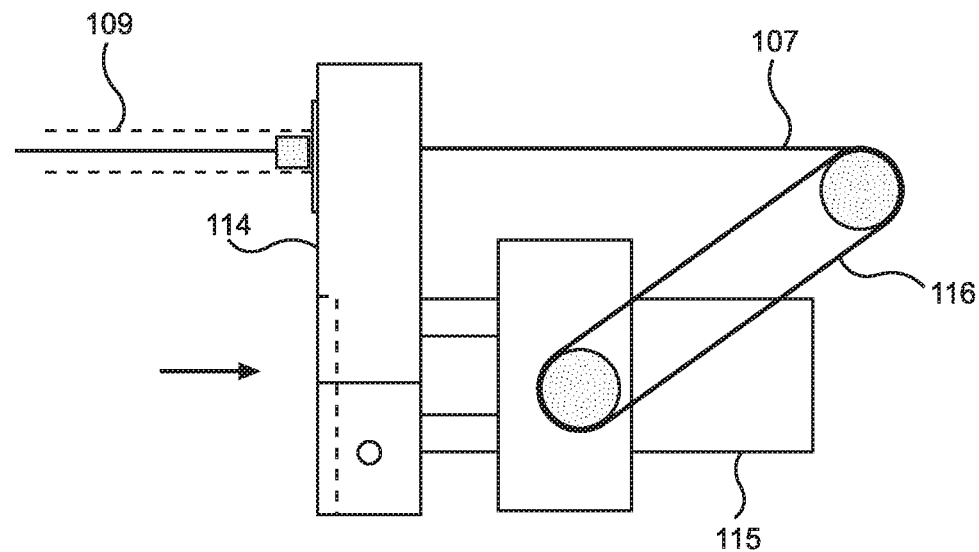
FIG. 5A is a side view of the water valve cable perch of the invention, with the direction of water flow indicated by an unnumbered arrow.
Figure 5B:
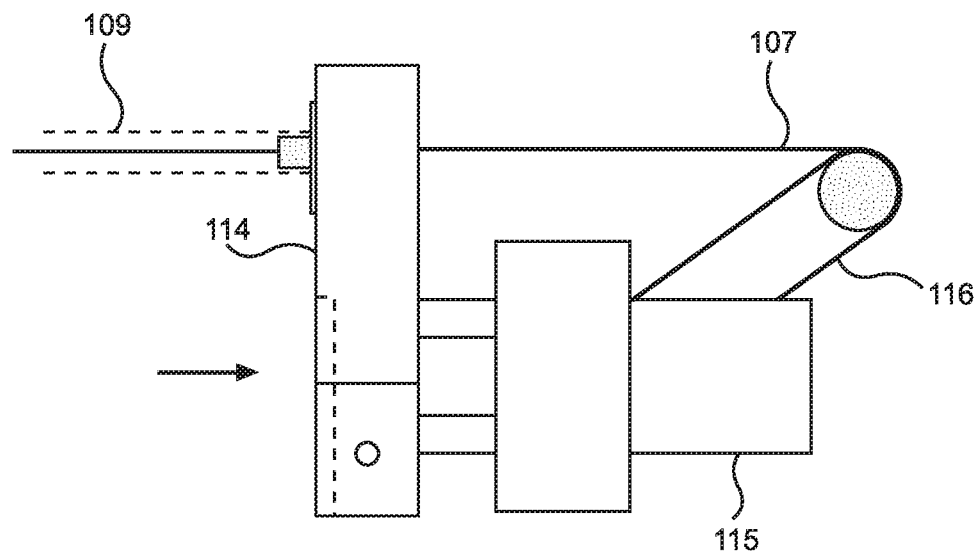
FIG. 5B is a side view of the water valve cable perch of the invention, with the direction of water flow indicated by an unnumbered arrow.
Figure 6:
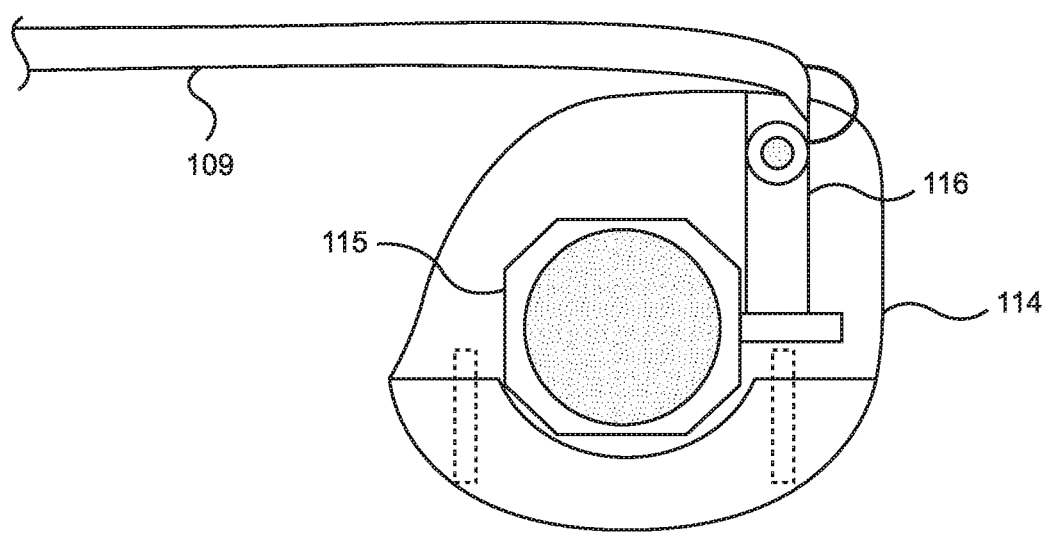
FIG. 6 is a front view of the water valve control perch of the invention.

The cable housing (109) then attaches to the water valve cable perch (114) as shown in FIG. 4. The water valve cable perch (114) is attached to the water feed pipe of the shower and sits between the water supply and the shower head. The water valve cable perch (114) sits on the back of water valve (115). The second end of the activation cable (107) attaches to water valve control arm (116). A guide edge on the valve perch (114) may be used to make accurate positioning on the water valve (115).

In the event of a fall by the user, the pulling force on the lanyard (103) by the belt (100) worn by the user slides the slide release rod (106) in the slide release tube (110) thereby pulling the activation cable (107) and closing the water valve arm (116) which closes water valve (115) and prevents water flow from the water supply to the shower head. Once passed through its movement, the first end of the rod (106) slides to the first open end of the slide release tube (110) and lanyard (103) connecting nipple (105) is released.

Figure 7:
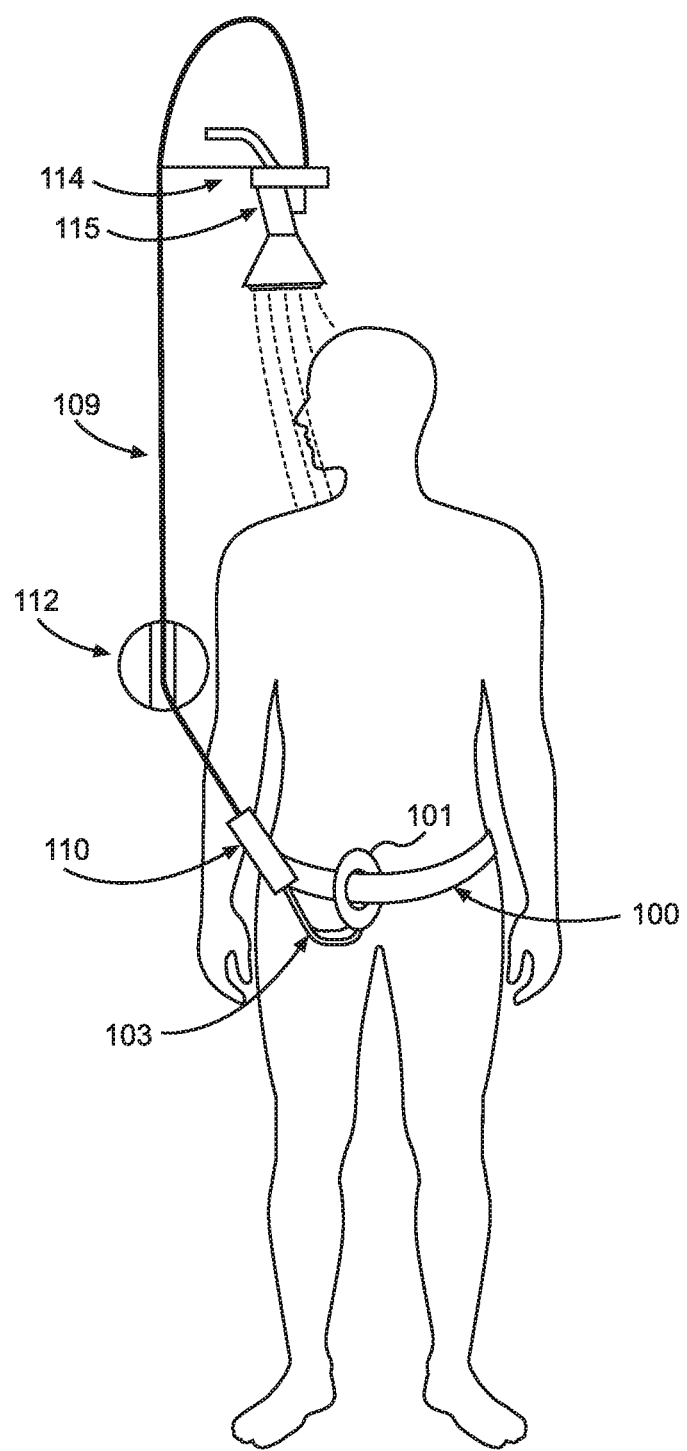
FIG. 7 is a perspective view showing the invention attached to a user.

FIG. 7 is a schematic diagram showing the present invention attached to a user in a shower setting. The belt (100) is worn around the waist of the user, the lanyard connection strap (103) is connected to the slide release rod as described above, which is inside slide release tube (110) which passes through the cable guide (112). The cable housing (109) is held firmly by cover plate (113) allowing the activation cable (107) free movement. Certain elements are not shown in FIG. 7, including the cover (113), and clasps (102), though they are described elsewhere. The cable housing (109) and activation cable (107) run up the wall to join the water valve cable perch (114) which is fixed to the back of water valve (115) which is connected to water feed pipe. The cable housing (109) sits in the perch (114) and the activation cable (107) attaches to the water valve control arm (116). In this configuration, the system is active.

Figure 8:
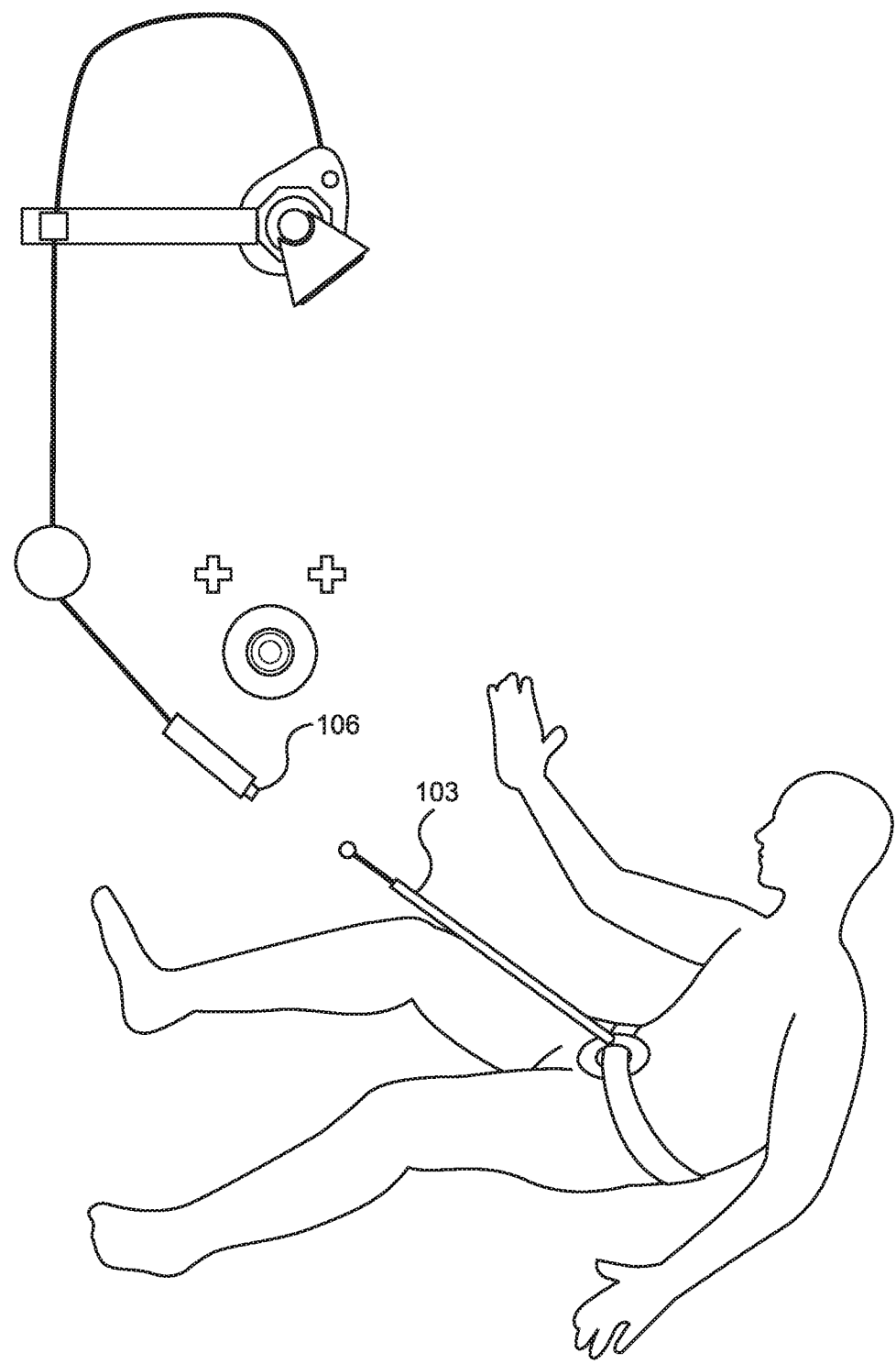
FIG. 8 is a perspective view showing the invention attached to a user following a fall by the user.

FIG. 8 shows a representation depicting the present invention after a fall by the user. The slide release rod (106) has gone through its movement. The water valve is in the closed position and the lanyard (103) has disconnected.

It is an object of the present invention that it be easily installed by a qualified contractor or a person of some skill in installations of this sort.

It will be appreciated that, in certain embodiments, the choice of cable guide used will relate to the shower stall type.

In certain embodiments in which a fiberglass shower stall is be fitted, it will be appreciated that a cable guide may be preferred.

In certain embodiments involving installation on older homes, it will be appreciated that a cable bar may be used.

In certain embodiments, such as, for example, installation in a rental apartment or house where permanent installations may not be desirable or possible, it will be appreciated that one or more cable guides may be recommended.

It will be appreciated that this invention may have applications in hotels, group homes, retirement homes and hospitals, among other institutions.

The said device is reusable and it will be appreciated that it can be adjusted to suit any height.

The invention claimed is:

1. A safety device for prevention of drowning, comprising:
    a harness, the harness comprising a belt configured to be worn by a user and a lanyard having first and second ends, a hoop at the first end connecting the lanyard to the belt, the lanyard further comprising a quick release clasp, and a nipple at the second end;
    a tube containing a rod, the rod freely slidable within the tube;
    a cable having first and second ends, the cable contained and freely movable within a cable housing;
    a guide configured to attach to a surface adjacent a shower, the guide receiving the cable housing therein;
    a water valve having a valve arm and a perch attached to the water valve;
    wherein the tube has a first open end and a second end attached to the cable housing;
    wherein the nipple is attached to the rod;
    wherein the cable is attached on the first end to the valve arm and on the second end to the rod;
    wherein, in response to a pulling force on the lanyard, the rod slides in the tube thereby pulling the cable and closing the water valve, the lanyard released from the rod when the rod slides out of the first open end of the tube.

2. The safety device of claim 1, wherein the nipple is received in a seat of the rod.

3. The safety device of claim 1, wherein the perch guides the cable to the valve arm.

4. The safety device of claim 1, wherein the belt is a nylon belt.

* * * * *